US007338176B2

(12) United States Patent
Svensson-Hilford et al.

(10) Patent No.: US 7,338,176 B2
(45) Date of Patent: Mar. 4, 2008

(54) ELEVATOR INSTALLATION WITH INFORMATION REPRESENTATION ON A SHAFT DOOR

(75) Inventors: Lennart Svensson-Hilford, Berlin (DE); Paul Friedli, Rementschwil (CH)

(73) Assignee: Inventio AG, Hergiswil NW (CH)

( * ) Notice: Subject to any disclaimer, the term of this patent is extended or adjusted under 35 U.S.C. 154(b) by 189 days.

(21) Appl. No.: 11/249,779

(22) Filed: Oct. 13, 2005

(65) Prior Publication Data

US 2006/0077360 A1 Apr. 13, 2006

(30) Foreign Application Priority Data

Oct. 13, 2004 (EP) .................................. 04105019

(51) Int. Cl.

| | |
|---|---|
| ***G03B 21/00*** | (2006.01) |
| ***G03B 21/28*** | (2006.01) |
| ***G03B 21/56*** | (2006.01) |
| ***B66B 1/34*** | (2006.01) |
| ***G09F 7/00*** | (2006.01) |
| ***H04N 5/64*** | (2006.01) |
| ***H04N 9/31*** | (2006.01) |
| ***G02F 1/1335*** | (2006.01) |

(52) U.S. Cl. .......................... 353/122; 353/78; 353/79; 353/99; 187/396; 359/460; 348/744; 349/6

(58) Field of Classification Search ................ 353/122, 353/98, 99, 74, 78, 79, 119, 121; 187/396, 187/401, 414; 359/443, 453, 456, 460; 348/744; 349/6

See application file for complete search history.

(56) References Cited

U.S. PATENT DOCUMENTS

| | | | | |
|---|---|---|---|---|
| 4,577,177 | A * | 3/1986 | Marubashi | 187/396 |
| 6,076,638 | A * | 6/2000 | Gertz | 187/414 |
| 6,161,654 | A | 12/2000 | Sirigu et al. | 187/391 |

FOREIGN PATENT DOCUMENTS

| | | |
|---|---|---|
| EP | 1 069 065 | 1/2001 |

* cited by examiner

*Primary Examiner*—Rochelle Blackman
(74) *Attorney, Agent, or Firm*—Fraser Clemens Martin & Miller LLC; William J. Clemens

(57) ABSTRACT

An elevator installation includes an elevator car moved in an elevator shaft between floors in a building. A shaft door for closing the elevator shaft is arranged at each floor. A method for representing information on the shaft doors makes possible a qualitatively high-grade projection of an image on the shaft door. The shaft doors are formed to be at least partly transparent, wherein a projector is arranged in the elevator shaft and projects an image onto the side of the shaft door facing the elevator shaft.

15 Claims, 3 Drawing Sheets

ELEVATOR INSTALLATION WITH INFORMATION REPRESENTATION ON A SHAFT DOOR

BACKGROUND OF THE INVENTION

The present invention relates to an elevator shaft with an elevator car arranged to be movable in the elevator shaft between floors, wherein a shaft door for closing the elevator shaft is arranged on at least one floor. In addition, the present invention relates to a method for representing information on a shaft door of an elevator installation.

In order to bridge over the waiting time for an elevator car the passengers in the vicinity of the elevator installation are frequently shown information in the form of images or videos. These images can relate to the operation or status of the elevator installation or, however, simply contain advertising messages. An elevator installation is shown in European Patent EP 1 069 065 A1 in which a projector is arranged in an elevator lobby and projects an image onto a shaft door of an elevator installation or onto a car door of an elevator car.

The absence of elevators from modern buildings is no longer imaginable. Modern buildings are subject to a complicated architectonic design. The solution proposed in EP 1 069 065 A1 requires mounting of a projector in the elevator lobby. A mounting of that kind in the elevator lobby does, however, have a disadvantageous effect on the design, which is complicated in its nature, of modern office buildings, since the projector has to be suspended from a ceiling and deflecting devices for projection of an image have to be positioned.

Moreover, elevator lobbies in modern office buildings are exposed to normal light conditions. Under the influences of normal daylight a very high-quality projector is required for projection of an image on a shaft door by means of a video beamer or an overhead slide projector. Even high-quality and expensive projectors cannot actually project a qualitatively high-grade image in normal daylight.

A further problem in the installation of projectors in elevator lobbies is that the projector has to be arranged at a substantial distance from the shaft door in order to be able to represent an image or video over a large area. This has the consequence that a person entering the beam path of the projector darkens the image to be represented. This darkening can be avoided only partly by complicated constructions of image deflecting devices, wherein these constructions can spoil the architectonic design of the elevator lobby.

SUMMARY OF THE INVENTION

Against the above-discussed background, an object of the present invention is an elevator installation for and a method for representation of information on shaft doors of the elevator installation in which the representation of information is made possible without impairing the design of elevator lobbies and nevertheless achieving a qualitatively high-grade representation of information.

The present invention is based on the concept that in the case of elevator shaft doors consisting of glass or a partly transparent material it is possible to project an image from the elevator shaft. In a case of projection of that kind the image is projected by the projector onto a side of the shaft door facing the elevator shaft. Due to the property of the shaft door to reflect an incident light beam only partly, an image is imaged on the other side, which faces the elevator lobby, of the shaft door.

In a modern office building glass or a similar material which is at least partly transparent is frequently used for shaft doors. This characteristic is advantageously utilized in the case of the elevator installation according to the present invention. By virtue of the projection from the elevator shaft it is no longer necessary to arrange a projector and deflecting devices in the elevator lobby. Darkened light conditions prevail in most elevator shafts so that projection from the elevator shaft onto a shaft door can take place with a high quality. A further advantage results from the fact that nobody can enter the beam path of the projector. Thus, darkening of the represented information is prevented.

In one advantageous embodiment of the present invention there is incorporated in the shaft door a material which enables representation of an image on a side of the shaft door oriented towards the elevator lobby. For example, it is possible to incorporate in shaft doors, which consist of glass, a film which produces a partial reflection of the light beams back into the elevator shaft, wherein an image is imaged, by this incomplete reflection, on the side of the shaft door oriented towards the elevator space. This has the advantage that a person waiting in the elevator lobby is not dazzled by the light radiated by the projector. Moreover, an improvement in the contrast of the represented image is possible by the arrangement of the film in the glazed shaft doors.

In a further advantageous embodiment of the present invention it is proposed to arrange at least one optical deflecting device, which projects the light beams emanating from the projector onto the shaft door, in the elevator shaft. Through use of deflecting devices of that kind it is possible to position the projector at any location in the elevator shaft.

In the case of an advantageous embodiment of the present invention the projector is arranged in the elevator shaft opposite the shaft door. An arrangement of that kind of the projector does not require any further devices for deflecting the light beams.

In the case of use of the above-mentioned deflecting devices the arrangement of the projector at a shaft door wall or at left-hand or right-hand walls in the elevator shaft is made possible. Almost any free space in the elevator shaft can thereby be utilized in order to mount the projector in a space-saving and unobtrusive manner.

In the case of a further preferred embodiment of the present invention an image doubling unit is associated with the projector. It is possible by means of an image doubling unit of that kind to produce two identical light beams from one light beam. These two light beams are each conducted to a respective shaft door. In that case it is possible to reproduce the image on a direct path on two shaft doors. Depending on the respective arrangement of the projector in the elevator shaft a deflecting device can, however, also be required in order to conduct the two light beams, which are delivered by the image doubling unit, to the respective shaft doors and to image the images thereon.

In a special embodiment of the present invention a deflecting device is constructed as a mirror. A mirror of that kind reflects the arriving light beams onto the shaft door, wherein through orientation of the mirror it is possible to orient the projection precisely on the shaft door.

In a further advantageous embodiment of the present invention the elevator car is fastened to an elevator cable and connected with a control unit by way of a suspended cable. In order to enable interference-free projection of an image onto the shaft door, the projector and optionally also the deflecting devices are positioned in the elevator shaft at positions which enable projection of the image past the elevator cable and/or suspended cable. For example, the arrangement of the projector in a corner of the elevator shaft is possible, so that the light beams run past the elevator cable and suspended cable and are incident on the shaft door.

It is advantageous if the sensors that detect a position of the elevator car are arranged in the elevator shaft and the projection of the image can be switched off or switched on in dependence on the elevator car position. It is made possible by these sensors to stop the projection at the respective floor when an elevator car arrives. After the elevator car has again freed the shaft door, the projection is continued.

In an advantageous embodiment of the present invention the projector is arranged within the shaft door wall, wherein the image is projected in the elevator shaft to the deflecting devices arranged there. The deflecting devices deflect the light beams to the respective shaft door. The arrangement of the projector and the shaft door wall makes it possible for the projector to be accessible from an elevator lobby. Thus, the projector can, for example, be maintained or adjusted independently of the operation of the elevator installation. This has the advantage that the service provider responsible for the projectors does not have to be familiar with the specifics of the elevator control, since otherwise the projectors could only be maintained and operated by the elevator service providers.

Depending on the respective arrangement of the projector in the elevator shaft it is necessary for the projector to issue a laterally correct or mirror-inverted image. Thus, in the case of a direct projection with opposite arrangement of the projector relative to the shaft door a mirror-inverted projection of the image onto the side of the shaft door directed towards the elevator shaft is required so that the image is represented laterally correct on the opposite side, which faces the elevator lobby, of the shaft door. In the case of arrangement of the projector at the shaft door wall or at the left-hand and right-hand walls in the elevator shaft and the use of deflecting equipment the image is reflected at the respective deflecting device so that the image has to be issued in laterally correct form by the projector.

The method according to the present invention proposes that a projector for issue of an image is arranged in the elevator shaft and the image is projected onto a side of the shaft door oriented towards the elevator shaft, wherein the shaft door is partly transparent so that a laterally correct image is represented on the side of the shaft door facing a elevator lobby.

DESCRIPTION OF THE DRAWINGS

The above, as well as other, advantages of the present invention will become readily apparent to those skilled in the art from the following detailed description of a preferred embodiment when considered in the light of the accompanying drawings in which.

DESCRIPTION OF THE PREFERRED EMBODIMENT

Figure 1:
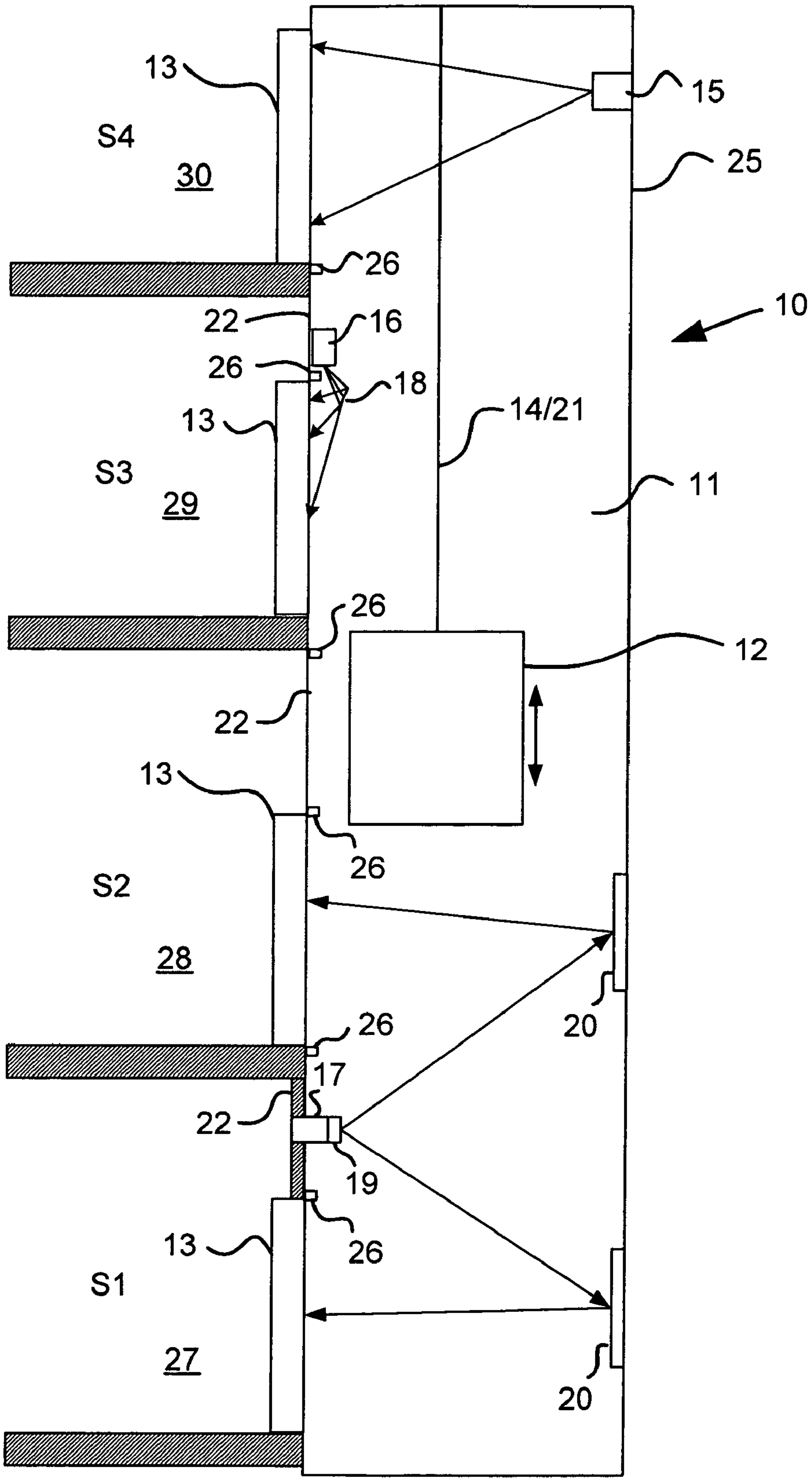
FIG. 1 is a schematic illustration of an elevator shaft with several projectors according to the present invention.

The construction of an elevator installation 10 according to the present invention is explained with reference to FIG. 1. The elevator installation 10 comprises an elevator shaft 11 in which an elevator car 12 is moved between floors S1, S2, S3 and S4. The elevator car 12 is fastened to an elevator cable 14 and is moved by a motor (not illustrated) between the individual floors S1 to S4. The elevator car 12 is connected by a suspended cable 21 with a control unit (not illustrated). The elevator shaft 11 is closed by respective shaft doors 13 at the floors S1 to S4. Elevator lobbies 27, 28, 29 and 30 are disposed in front of the shaft doors 13 in the respective floors S1 to S4. The elevator shaft 11 has a shaft door wall 22 which delimits the elevator shaft 11 from the elevator lobbies 27 to 30. As illustrated in FIG. 2, left-hand and right-hand walls of the elevator shaft 11 are denoted by the reference numerals 23 and 24 respectively. The elevator shaft wall opposite the shaft doors 13 is denoted by the reference numeral 25.

Figure 2:
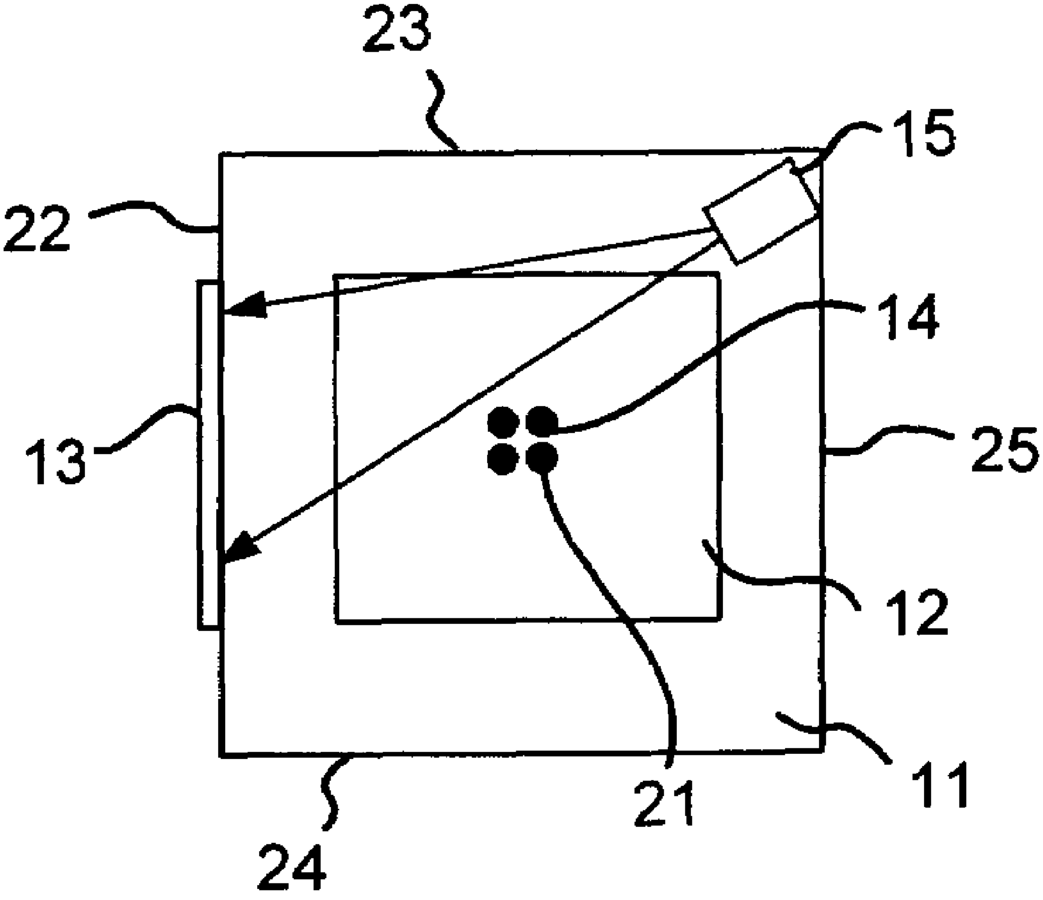
FIG. 2 is a top plan view into the elevator shaft according to FIG. 1.

Several alternative arrangements for projectors 15, 16 and 17 in the elevator shaft 11 are illustrated in FIG. 1. A first possible arrangement of the projector 15 is illustrated at the floor S4. The projector 15 is arranged opposite the shaft door 13 on the wall 25 and projects the image onto the shaft door 13, so that the image is imaged in the elevator lobby 30. The projector 15 must, for laterally correct representation of the image in the elevator lobby 30, issue the image in mirror-inverted form.

An alternative arrangement of a projector is shown at the floor S3. The projector 16 is arranged at the shaft door wall 22. In that case, a deflecting device 18 in the form of a mirror is associated with the projector 16 and reflects onto the shaft door 13 the light beams issued from above. In the arrangement of the projector 16 at the floor S3 it is necessary for the image to be issued in laterally correct form, since the mirror 18 undertakes reflection of the image.

A further possibility of the arrangement of a projector is illustrated at the floors S1 and S2. Here the projector 17 is integrated in the shaft door wall 22 and consequently accessible from the elevator lobby 27. An image doubling unit 19 is associated with the projector 17 and generates, from one light beam, two light beams which are conducted to the respective mirrors 20 mounted on the wall 25 at the floor S1 and the floor S2. The mirrors 20 at the floors S1 and S2 reflect the image onto the respective shaft doors 13 at the floors S1 and S2. An arrangement of that kind has the advantage that only the one projector 17 is required for representation of information on the shaft doors 13 at the two floors S1 and S2.

Sensors 26 which detect the position of the elevator car 12 in the elevator shaft 11 are arranged in the region of upper and lower sides of the shaft doors 13. When the elevator car 12 moves into the region of the floor S3, i.e. moves upwardly, the projection of the projector 16 is stopped by a control unit (not illustrated). After the elevator car 12 has left the position at the floor S3, the projection by projector 16 is continued. In the case of use of the one projector 17 for two floors, as is illustrated at the floors S1 and S2, the projection for each floor S1, S2 can be selectively started or stopped. This means that in the case of movement of the elevator car 12 to floor S2 the projection at the floor S2 is interrupted. For example, the image doubling, which is provided for the second floor S2, is switched off in the image doubling unit 19. Equally, in the case of movement of the elevator car 12 to the floor S1 the projection of the projector 17 is stopped for the floor S1.

In order to enable interference-free representation of an image on the shaft door 13 it is advantageous to arrange the projector 15 in a corner in the elevator shaft 11. This is schematically illustrated in FIG. 2. The projector 15 is arranged substantially opposite the shaft door 13. So that the projection of the image is not disturbed by the elevator cable 14 or the suspended cable 21, the light beam is so oriented that it runs past the elevator cable 14 and the suspended cable 21. A disturbance-free projection of the image on the shaft door 13 is thus made possible. This necessitates distortion of the image, which, however, is not problematic with modern projectors or video beamers 15 to 17.

Figure 3:
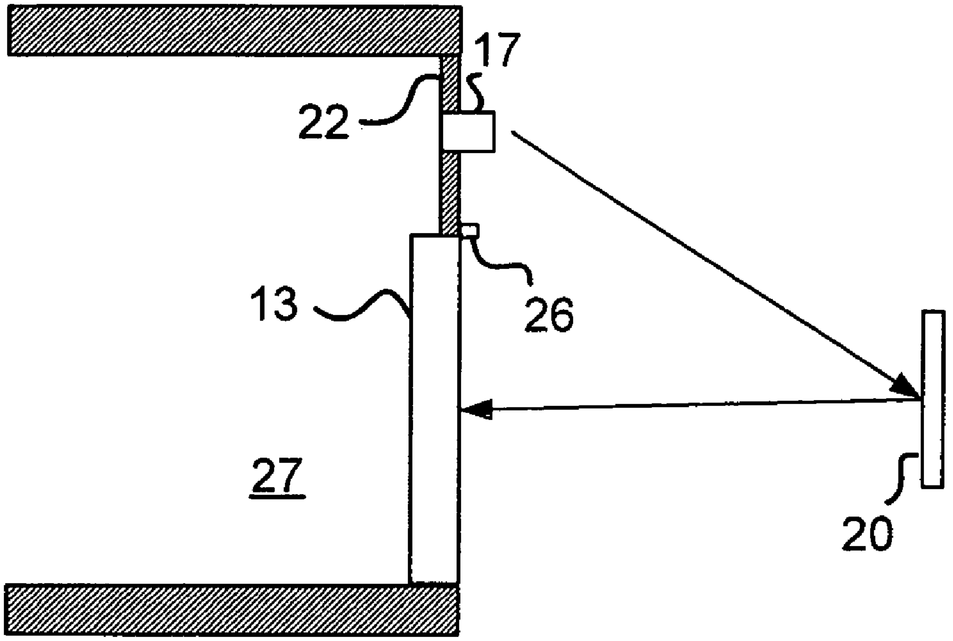
FIG. 3 is a schematic illustration of an elevator shaft with a projector according to a preferred embodiment of the present invention.

An alternative preferred arrangement of a projector is shown in FIG. 3. The projector 17 is arranged at the shaft door wall 22. In that case the deflecting device 20 in the form of a mirror, which reflects the light beams issued from above onto the shaft door 13, is associated with projector 17. An arrangement of that kind has the advantage that a complicated and costly image processing unit is not required for representation of information on the shaft doors 13, since the light beam has an optimum optical path.

The shaft doors 13 preferably consist of glass panes, in which a film is incorporated as a rear projection film. Films of that kind typically contain aluminum particles which reflect the incident light beam several times. A person waiting in the elevator lobby 27 to 30 is thereby not dazzled by the incident light beam. At the same time, imaging of an image on the side of a shaft door 13 facing the elevator lobby 27 to 30 is thereby made possible. Even a translucent glass coating is suitable for the representation, in accordance with the present invention, of information on shaft doors 13.

With the afore-described elevator installation 10 and the method for representation of information on shaft doors 13 it is made possible to represent information on partly transparent shaft doors in a qualitatively high-grade manner. Through the mounting of the projectors 15, 16 and 17 in the elevator shaft 11 a disfiguring of the elevator lobbies 27 to 30 by complicated installation devices is avoided. Equally, the projection onto the shaft door 13 cannot be distorted by persons waiting in front of the shaft door 13 for the elevator car 12.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. An elevator installation including an elevator car movable in an elevator shaft between floors in a building comprising:

a shaft door for closing the elevator shaft arranged on at least one of the floors, said shaft door being at least partly transparent; and a projector for projecting an image, said projector being mounted in the elevator shaft for projecting the image onto a side of said shaft door facing the elevator shaft whereby the image is visible on a side of said shaft door facing the at least one floor.

2. The elevator installation according to claim 1 wherein said shaft door includes a material enabling representation of the image on the side of said shaft door facing the at least one floor.

3. The elevator installation according to claim 2 wherein said material is a film coating said shaft door for partly reflecting a light beam incident from said projector.

4. The elevator installation according to claim 3 wherein said film contains aluminum particles.

5. The elevator installation according to claim 1 including at least one optical deflecting device provided in the elevator shaft for redirecting a light beam from said projector onto said shaft door.

6. The elevator installation according to claim 1 wherein said projector is arranged in the elevator shaft substantially opposite said shaft door.

7. The elevator installation according to claim 1 wherein said projector is arranged on a wall of the elevator shaft.

8. The elevator installation according to claim 1 including an image doubling unit associated with said projector for projection of the image onto at least another shaft door at another one of the floors.

9. The elevator installation according to claim 1 wherein the elevator car is fastened to an elevator cable and connected with a suspended cable and at least one of said projector and a deflecting device is positioned to project the image past the elevator cable and the suspended cable.

10. The elevator installation according to claim 1 including a sensor for detecting a position of the elevator car mounted in the elevator shaft and connected to said projector for switching off said projector in dependence on the position of the elevator car relative to said shaft door.

11. The elevator installation according to claim 1 wherein said projector is mounted in a shaft door wall of the elevator shaft and is accessible from an elevator lobby of the at least one floor.

12. The elevator installation according to claim 1 wherein said projector projects the image in such a manner that a laterally correct image is represented on the side of the shaft door facing the at least one floor.

13. A method for representing information on a shaft door of an elevator installation comprising the steps of:

a. providing a projector in an elevator shaft;

b. providing an at least partly transparent shaft door; and c. projecting an image from the projector onto a side of the shaft door oriented towards the elevator shaft whereby a laterally correct image is represented on a side of the shaft door facing an elevator lobby.

14. An elevator installation including an elevator car movable in an elevator shaft between floors in a building comprising:

a shaft door for closing the elevator shaft arranged on one of the floors, said shaft door being at least partly transparent;

a projector for projecting an image mounted in the elevator shaft at a wall of the elevator shaft above said shaft door; and a deflecting device mounted in the elevator shaft for redirecting the image onto a side of said shaft door facing the elevator shaft whereby the image is visible on a side of said shaft door facing the one floor.

15. The elevator installation according to claim 14 including a sensor for detecting a position of the elevator car mounted in the elevator shaft and connected to said projector for switching off said projector in dependence on the position of the elevator car relative to said shaft door.

* * * * *